United States Patent
Gray et al.

(10) Patent No.: US 12,434,301 B1
(45) Date of Patent: Oct. 7, 2025

(54) DETECTING AND REMOVING DEFECTS IN LASER POWDER BED FUSION MANUFACTURING

(71) Applicant: Honeywell Federal Manufacturing & Technologies, LLC, Kansas City, MO (US)

(72) Inventors: Jamee-Dawn Marie Gray, Kansas City, MO (US); Benjamin Ross Brown, Lee's Summit, MO (US); Daniel Scott Kessler, Stilwell, KS (US); Andrew David Deal, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 811 days.

(21) Appl. No.: 17/557,523

(22) Filed: Dec. 21, 2021

(51) Int. Cl.
  *B22F 10/50* (2021.01)
  *B22F 12/90* (2021.01)
  *B23K 26/0622* (2014.01)
  *B23K 26/38* (2014.01)
  *B33Y 40/00* (2020.01)

(52) U.S. Cl.
  CPC ............. *B22F 10/50* (2021.01); *B22F 12/90* (2021.01); *B23K 26/0624* (2015.10); *B23K 26/38* (2013.01); *B33Y 40/00* (2014.12)

(58) Field of Classification Search
  CPC ...... B22F 10/50; B22F 12/90; B23K 26/0624; B23K 26/38; B33Y 40/00
  See application file for complete search history.

(56) References Cited

U.S. PATENT DOCUMENTS

| | | | |
|---|---|---|---|
| 7,777,155 B2 | 8/2010 | Twelves, Jr. et al. | |
| 9,555,475 B2 | 1/2017 | Sidhu et al. | |
| 9,950,476 B2 | 4/2018 | Nguyen et al. | |
| 2013/0101728 A1 | 4/2013 | Keremes et al. | |
| 2015/0041025 A1* | 2/2015 | Wescott | B23K 26/32 |
| | | | 266/241 |
| 2017/0059529 A1 | 3/2017 | Kamel et al. | |

(Continued)

FOREIGN PATENT DOCUMENTS

| | | | |
|---|---|---|---|
| EP | 3587006 A1 * | 1/2020 | ............. B22F 10/28 |
| GB | 2500996 A | 10/2013 | |

OTHER PUBLICATIONS

X. Song et al.; Residual stress measurement in thin films using the semi-destructive ring-core drilling method using Focused Ion Beam; Procedia Engineering; 2011; pp. 2190-2195.

(Continued)

*Primary Examiner* — Michael W Choi
(74) *Attorney, Agent, or Firm* — Erise IP, P.A.

(57) ABSTRACT

Systems, methods, and programs for detecting and removing defects on a part during laser powder bed fusion manufacturing are described. A sensor may detect defects on the part during manufacturing of the part. A controller may obtain the sensor data and determine the defect and control a short-pulse laser to remove the defect. Furthermore, processes of manufacture and material properties of the part may be evaluated to determine a likelihood of a defect and the short-pulse laser may be operated to reduce the likelihood of the defect. Furthermore, the short-pulse laser may be operated to reduce stress in layers of the part.

20 Claims, 5 Drawing Sheets

(56) References Cited

U.S. PATENT DOCUMENTS

| | | | |
|---|---|---|---|
| 2017/0203364 A1 | 7/2017 | Ramaswamy et al. | |
| 2019/0054533 A1* | 2/2019 | Kenney | B29C 64/153 |
| 2019/0303717 A1* | 10/2019 | Bhaskar | G06F 18/214 |
| 2021/0016509 A1* | 1/2021 | Vora | B29C 64/393 |
| 2022/0063200 A1* | 3/2022 | Kothari | B29C 64/194 |
| 2022/0088685 A1* | 3/2022 | Kenworthy | B22F 10/37 |
| 2022/0161332 A1* | 5/2022 | Khairallah | B33Y 30/00 |
| 2023/0286080 A1* | 9/2023 | Walker | B08B 15/04 |

OTHER PUBLICATIONS

M. Saunders; How process parameters drive successful metal AM part production; Metal AM; 2018; vol. 4 No. 2; pp. 127-135, https://www.metal-am.com/wp-content/uploads/sites/4/2018/07/MAGAZINE-Metal-AM-Summer-2018-sp.pdf, accessed Jan. 17, 2022.

* cited by examiner

DETECTING AND REMOVING DEFECTS IN LASER POWDER BED FUSION MANUFACTURING

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to systems, processes, and programs for reducing defects in an additive manufacturing process. Specifically, embodiments of the invention relate to reducing defects in a laser powder bed fusion process by using a short-pulse laser.

2. Related Art

Generally, parts may be manufactured by laser powder bed fusion (LPBF) manufacturing processes. During the manufacturing process an additive manufacturing (AM) laser may be used to melt powder locally to form a geometry of the part being manufactured. As the laser moves across the metal powder, the metal powder is melted and subsequently cools and hardens to form the geometry of the part. In some cases, when the material is melted, small metal particles or liquid metal droplets called spatter splash out of the melt pool of metal material. The spatter may land on nearby solidified portions of the part, thereby creating defects in the part. The spatter may melt the formed part and/or may solidify on the part creating the defects. If the defects are not corrected before the next layer of the part is formed, the defects may be permanently embedded in the part. This may result in compromised material properties which may lead to weakness in the part and/or even failure.

In some cases, defects such as spatter, pores, curl up, and stress build-up between layers may occur during typical LPBF processes. When the AM laser interacts with the metal powder, heat is generated to melt the metal powder. In some cases, because of the heat, a metal vapor is formed, and a vapor plume may be ejected from the metal vapor. This process may create defects in the part such as, for example, pores and uneven topology as described above. The pores may be covered by subsequent layers and the uneven topology may be compounded by subsequent layers, both resulting in compromised material properties.

Typical LPBF processes also require inert gas addition to reduce the vapor plumes from forming and ejecting from the metal vapor. The inert gas may also reduce air near the metal vapor reducing the likelihood that impurities may be incorporated into the part. However, the inert gas may flow across the metal vapor unevenly causing uneven cooling of the part and, thus, causing varying material properties across the layer of the part. The uneven material properties may result in weaknesses in the part.

In some cases, each layer of the part is added by supplying the metal powder and melted and welded to the subsequent layer by heating with the AM laser. When the layers cool at different rates, stress may build up between the layers. In some cases, the stress between layers is great enough to cause defects in the material such as curl up and cracking, which results in weakness and part failure.

What is needed is a method of detecting the defects on the part and removing the defects while not slowing or stopping the LPBF manufacturing process.

SUMMARY

Embodiments of the invention solve the above-described problems by providing systems and methods for detecting the defects on the surface of the part or in the LPBF process and employing a short-pulse laser to correct the defects. A first embodiment is directed to system for detecting and removing defects on a part during laser powder bed fusion manufacturing. The system comprises a sensor for detecting a defect on the part, a laser operable to remove the defect, a processor, and one or more non-transitory computer-readable media storing computer-executable instructions that, when executed by the processor, perform a method of detecting and removing the defect from the part. The method comprises obtaining sensor data from the sensor, determining the defect on the part from the sensor data, determining a location of the defect on the part, controlling the laser to be directed at the defect, and activating the laser to remove the defect.

A second embodiment is directed to a method of detecting and removing defects on a part during laser powder bed fusion manufacturing. The method comprises: detecting a defect on the part by a sensor, determining the defect on the part by a processor, determining a location of the defect by the processor, controlling a short-pulse laser to be directed at the defect by the processor, and activating the short-pulse laser to remove the defect by the processor.

A third embodiment is directed to one or more non-transitory computer-readable media storing computer-executable instructions that, when executed by a processor, perform a method of detecting and removing defects on a part during laser powder bed fusion manufacturing. The method comprises detecting, by a sensor, a defect on the part; determining, by the processor, a classification of the defect on the part; determining, by the processor, a location of the defect; controlling, by the processor, a short-pulse laser to be directed at the defect; and activating, by the processor, the short-pulse laser to remove the defect.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Programs, systems, and processes for correcting defects in a laser powder bed fusion (LPBF) part manufacturing process are described. In some embodiments, during the LPBF process, a sensor may detect defects in the part being manufactured or in the manufacturing process. A controller may obtain the sensor data and control a short-pulse laser to correct the defects. Various defects caused by the LPBF process may be detected and corrected, thus improving the manufacturing process of the part and more accurately producing the part while maintaining part material properties.

Figure 1:
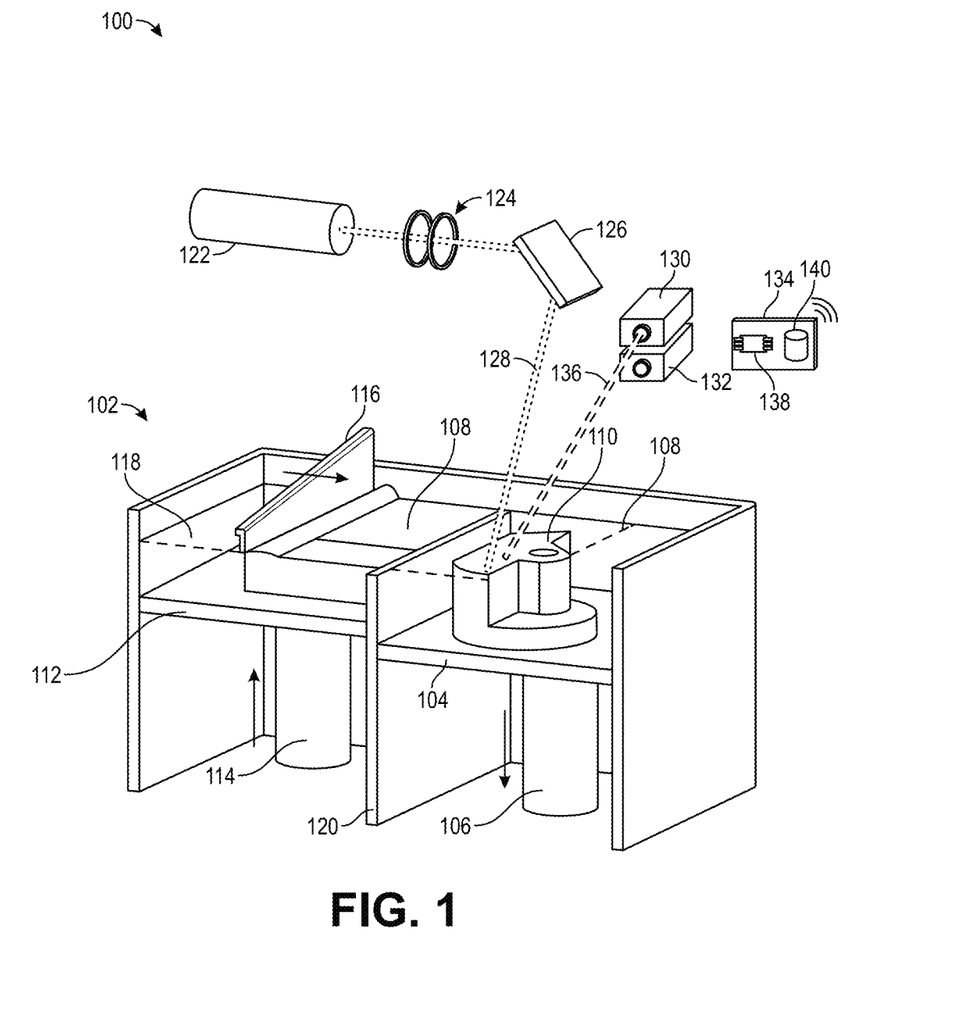
FIG. 1 illustrates a first embodiment of manufacturing a part using the LPBF process.

FIG. 1 depicts LPBF system 100. In some embodiments, LPBF system 100 is operable to manufacture parts by the LPBF process. LPBF system 100 may comprise LPBF table 102. In some embodiments, LPBF table 102 comprises build platform 104 and build platform piston 106. Metal powder 108 may be disposed on build platform 104 for manufacturing of part 110. Furthermore, LPBF table 102 comprises dispenser platform 112, dispenser platform piston 114, dispenser bed 118, and coater blade 116. Partition 120 may separate build platform 104 from dispenser platform 112 such that metal powder 108 may be spread over the top of partition 120 applying a layer of metal powder 108 from dispenser platform 112 to build platform 104. Partition 120 may move, for example, from left to right, as shown, to move a thin layer of metal powder 108 over part 110 for manufacturing of part 110.

LPBF system 100 may be operable to manufacture part 110. In some embodiments, platform piston 106 lowers/raises build platform 104 and dispenser platform piston 114 raises/lowers dispenser platform 112. Coater blade 116 may move from dispenser platform 112 to build platform 104 thereby moving a thin layer of metal powder 108 to build platform 104, thus, covering part 110 with a thin layer of metal powder 108. When metal powder 108 is in place covering the previous layer of part 110, additive manufacturing (AM) laser 122 may be operated to melt the thin layer of metal powder 108 combining the thin layer of metal powder 108 with part 110. AM laser 122 may be operated to shoot AM laser beam 128 through a series of lenses 124 and reflect off mirror 126 to impact metal powder 108 at a designated location on part 110. Mirror 126 may be rotated such that AM laser beam 128 moves along part 110 melting metal powder 108 and the previous layer of part 110 to generate new layers of part 110. The process may then be repeated until the final geometry of part 110 is complete. The LPBF process described herein may include any known LPBF process. For example, direct metal laser sintering (DMLS), electron beam melting (EBM), selective heat sintering (SHS), selective laser melting (SLM), selective laser sintering (SLS), and any other method of LPBF may be used and any known laser technique may be used corresponding to the known manufacturing processes.

In some embodiments, metal powder 108 may be any type of metal powder that may be melted by AM laser beam 128 and provide the necessary characteristics for part 110. In some embodiments, metal powder 108 may include titanium, steel, stainless steel, aluminum, copper, cobalt chrome, nickel, gold, platinum, or any other metal or metal alloy, or mixtures thereof. Furthermore, metal powder 108 is only exemplary and any material may be used to manufacture part 110. For example, plastics, polymers, or liquids may be used in a similar manner in some additive manufacturing processes.

In some embodiments, LPBF system 100 comprises short-pulse laser 130, sensor 132, and controller 134. Short-pulse laser 130 may be operable to fire short-pulse laser beam 136, which may be operable to quickly melt away defects on part 110 while not substantially affecting areas of part 110 proximate the defects. Sensor 132 may be operable to detect defects in the process of manufacturing part 110. Controller 134 may be operable to obtain the sensor data collected by sensor 132 and provide instructions to short-pulse laser 130 and any actuators associated with short-pulse laser 130 to direct short-pulse laser beam 136 to a defect on part 110. In some embodiments, short-pulse laser 130 is an ultra high-speed laser, such as a femtosecond laser or a nanosecond laser. In some embodiments, short-pulse laser 130 is an ultra short-pulse laser or a continuous wave laser. In some embodiments, short-pulse laser 130 may be an ablating laser. In some embodiments, short-pulse laser 130 and AM laser 122 may be integrated into a single unit.

In some embodiments, LPBF system 100 may comprise controller 134, which may comprise one or more processors and memories to control the various components of LPBF system 100. In some embodiments, controller 134 may comprise one or more non-transitory computer-readable media storing computer-executable instructions that, when executed by a processor, perform the processes described herein. Controller 134 may be in communication with and, in some cases, control any components of LPBF system 100 including build platform 104, build platform piston 106, dispenser platform piston 114, coater blade 116, AM laser 122, mirror 126, short-pulse laser 130, sensor 132, and/or any other components that may be in communication with controller 134.

Sensor 132 may be any sensor that may detect defects on part 110 or during the process of manufacturing part 110. Sensor 132 may detect defects with AM laser beam 128, defects with part 110, and/or abnormalities in the manufacturing process. For example, sensor 132 may detect abnormal conditions with AM laser beam 128. For example, sensor 132 may be a thermal imaging camera to detect a heat of part 110 at the interaction point with short-pulse laser beam 136. For example, the temperature of part 110 may be determined to be out of a specified allowable range. Controller 134 may adjust short-pulse laser 130 to bring the energy of short-pulse laser beam 136, and thus the temperature, within range. Similarly, sensor 132 may detect defects with part 110 and detect abnormalities in the manufacturing process of part 110. The process of detecting and correcting defects is described in detail in embodiments below.

In some embodiments, controller 134 may comprise processor 138, data store 140, communication elements, and any other general computing elements. In some embodiments, controller 134 comprises one or more non-transitory computer-readable media storing computer-executable instructions that, when executed by processor 138, performs the processes described herein.

In some embodiments, controller 134 comprises computer-readable media including both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Generally, a data store such as data store 140 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer, accessible on a local network, or remotely accessible over public Internet.

Figure 2:
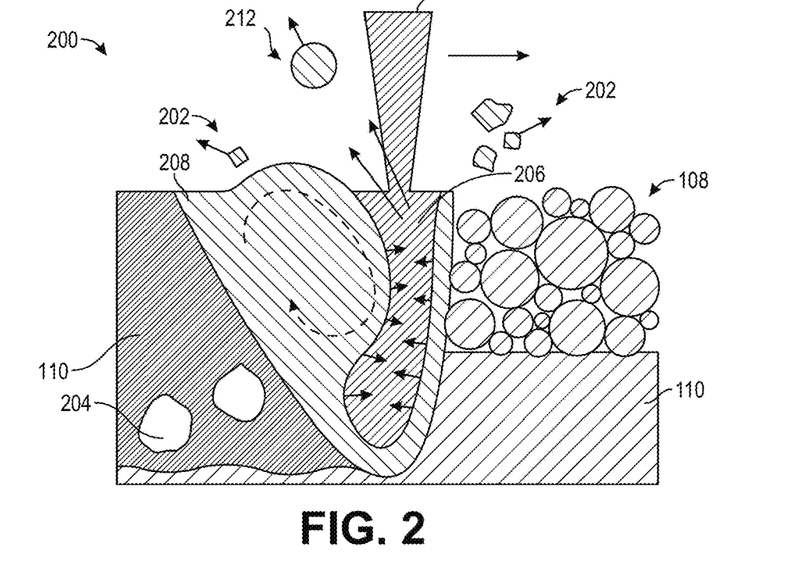
FIG. 2 depicts a close up view of the part manufacturing by the LPBF process.
Figure 3A:
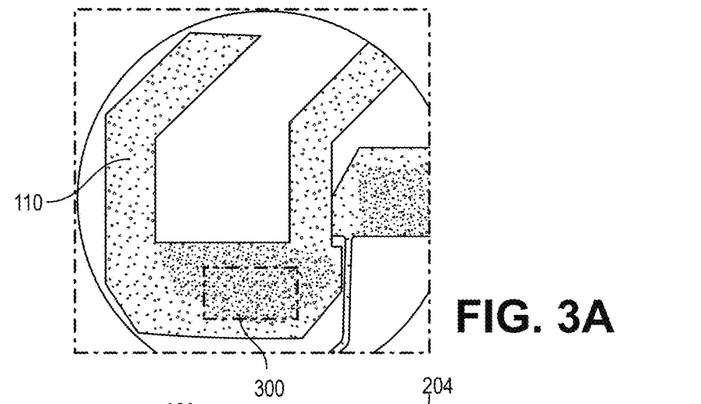
FIGS. 3A and 3B depict a close-up view of a metallographic image of the part with exemplary defects of spatter and pores.
Figure 3B:
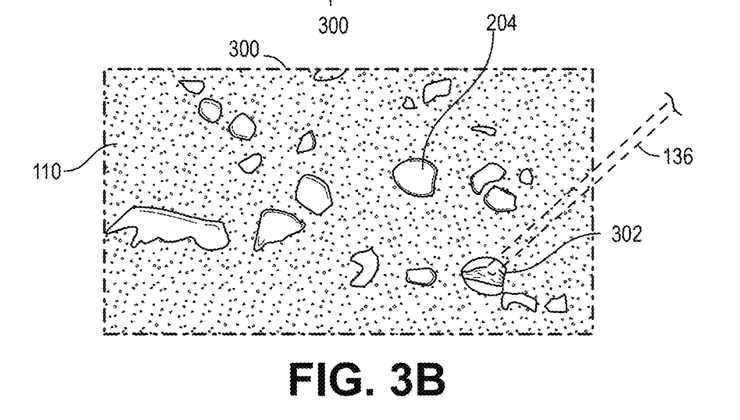

FIG. 2 depicts manufacturing part 110 by the LPBF process generally reference by the numeral 200. FIGS. 3A and 3B depict exemplary defects in part 110 caused by the LPBF process of FIG. 2. In some embodiments, AM laser beam 128 interacts with metal powder 108 and generates heat. The heat generated by the interaction between AM laser beam 128 and metal powder 108 may melt metal powder 108 creating metal vapor 206. Metal vapor 206 may quickly cool into melt pool 208 comprising metal liquid, then further cool to form a solid, forming part 110. During the process of melting and cooling, vapor plums and spatter particles may be ejected from metal vapor 206 and melt pool 208. Vapor plume 212 and spatter 202 may cause defects in part 110 as described below.

Spatter 202 may be liquid portions of metal powder 108 that has been melted and that are ejected from melt pool 208. Spatter 202 may fly from melt pool 208 and land on portions of part 110 that have already cooled and hardened, or land on portions of part 110 that are still hot liquid metal. When spatter 202 lands on cooled portions, spatter 202 may land on top of part 110 creating raised areas of material that cool and become hardened raised portions of part 110 represented in FIG. 3B as spatter particle 302. When a next layer of part 110 is added by the LPBF process described above, too much material may be added to the powder bed preventing AM laser beam 128 from melting through the excess metal powder 108 resulting in a lack of fusion between the previous layer and the current layer. Pores in the final part may result from the lack of fusion between layers. As such, the defect in part 110 may propagate throughout each subsequent material layer. This causes inconsistencies, or defects, in part 110 that could lead to part 110 having a rough surface, being out of specification, weakened in defect locations, and even failure.

In some cases, spatter 202 may land on melted portions of part 110. Spatter 202 may land on metal powder 108 and block AM laser beam 128 preventing AM laser beam 128 from fully melting metal powder 108 below spatter 202. As such, pores 204 may exist below spatter 202. Pores 204 may be portions of part 110 that lack material. The area surrounding pores 204 may have different grain structure to the material of the rest of part 110. When the next layer of material is added to part 110, pores 204 may remain. In some cases, pores 204 may be caused by vapor plumes 212. Vapor plumes 212 may be ejected from metal vapor 206 creating areas of reduced material that may cool and harden into pores 204. Furthermore, vapor plumes 212 may attenuate AM laser beam 128 resulting in inconsistent interactions between AM laser beam 128 and metal powder 108 resulting in pores 204. As such, holes or pores 204 may be left in part 110 that may cause weaknesses in part 110 and failure of part 110 in use.

FIG. 3A and FIG. 3B depict one embodiment of short-pulse laser beam 136, generated by short-pulse laser 130, ablating a solidified spatter particle 302 on the surface of part 110. FIG. 3A depicts part 110 including area 300 capturing defects on the surface of part 110. A close-up view of area 300 is depicted in FIG. 3B. Spatter particle may be detected on the surface of part 110. Spatter particle 302 may have a different grain structure from other spatter particles and from the surrounding material. In some embodiments, spatter particle 302 may range from about 50 μm to over about 250 μm.

This range is exemplary and short-pulse laser 130 may be configured to ablate any size of spatter particle 302. Short-pulse laser beam 136 may heat spatter particle 302. When spatter 202 is ejected from melt pool 208 and lands on part 110 becoming spatter particle 302, sensor 132 may detect both or either spatter 202 in flight and/or spatter particle 302 on the surface of part 110. Sensor 132, in some embodiments, may be any sensor that may detect the defects described herein. In some embodiments, sensor 132 may be a thermal camera, Red Green Blue (RGB) camera, high-speed camera, or any other type of camera. In some embodiments, sensor 132 may be a laser and optical sensor for measuring a distance between sensor 132 and part 110. As such, any portions of part 110 that are higher or lower than expected, or do not fit with the specified measurements, may be detected. In some embodiments, sensor 132 may be a plurality of sensors capable of detecting a plurality of electromagnetic wavelengths at various shutter speeds and distances. As such, sensor 132 may be configured to detect spatter 202 during flight from melt pool 208 to surface of part 110 and spatter particles on surface of part 110. Furthermore, variations in temperature may be detected such that spatter particle 302 may be detected against cooler surface background of part 110.

Using the detection of spatter 202 and spatter particle 302, a location of spatter particle 302 may be determined. In some embodiments, controller 134 may be configured to determine locations and types of defects on part 110 and operate short-pulse laser 130 to correct the defects. For example, spatter particle 302 may weld to the surface of part 110 causing a portion of part 110 to be raised with hardened material. As the temperature may be different between surface of part 110 and spatter particle 302, sensor 132 (e.g., a thermal camera) may detect the location of spatter particle 302. Processor 138 may utilize the temperature data to create a heat map of the surface of part 110. The heat map may be analyzed to determine locations of spatter particles 302. Similarly, sensor 132 may be a laser and optical sensor combination that detects the range between sensor 132, part 110, and spatter particle 302. In some embodiments, sensor 132 may be a blue light, three-dimensional, scanner, or light detecting and ranging (LIDAR) sensor. As such, the location of spatter particle 302 may again be determined as a topological aberration.

In some embodiments, the location of spatter particle 302 may be determined by controller 134 analyzing the sensor data collected at sensor 132. Controller 134 may receive the sensor data and analyze the sensor data to determine the location of the defect as well as the type of defect. The location of spatter particle 302 and location of AM laser beam 128 may be determined from the sensor data and any data associated with the manufacturing of part 110 such that short-pulse laser 130 may fire short-pulse laser beam 136 at spatter particle 302 without the LPBF process halting. Short-pulse laser beam 136 may interact with spatter particle 302 generating heat to quickly melt spatter particle 302 without significantly heating the area of part 110 immediately surround spatter particle 302. Short-pulse laser 130 may provide targeted heating such that only spatter particle 302 is ablated from part 110.

An amount of time that short-pulse laser beam 136 is applied to spatter particle 302 may be based on the size and shape of spatter particle 302 determined from the sensor data by controller 134. Systematic testing may have been performed and stored such that an initial interaction between short-pulse laser beam 136 and spatter particle 302 is generated. Furthermore, when the initial interaction is finished, the area may be re-evaluated for any remaining or additional defects by the combination of sensor 132 and controller 134. If any portion of spatter particle 302 remains, the remaining portion may be ablated. The heat generated from the interaction between short-pulse laser beam 136 and spatter particle 302 may cause a portion of part 110 surrounding spatter particle 302 to melt absorbing spatter particle 302 into part 110. As such, settings of short-pulse laser beam 136 and controller 134 may result in ablating spatter particle 302 or melting part 110 locally to join spatter particle 302 with part 110. Any configuration of short-pulse laser 130 and controller 134 may be implemented for a desired result.

The interaction between short-pulse laser beam 136 and the material of part 110 may generate the heat to ablate or otherwise melt the defect (e.g., pores 204, spatter particle 302), and may be caused by an amount of time, intensity, pulse rate, or the like, of application of short-pulse laser beam 136 applied to the area of the defect. The initial interaction may be determined from experimental processes along with machine learning algorithms, or in a closed feedback loop process detecting with sensor 132, controlling by controller 134, and ablating or melting by short-pulse laser 130.

Similarly, in some embodiments, short-pulse laser 130 may be configured and operated to correct pores 204. Sensor 132 may collect the sensor data that may be used by controller 134 to detect and classify pores 204. As described above, the defects may be compared to images of defects for classification by a machine learning algorithm such as, for example, a convolution neural network. When the defect is classified, in this case, as pore 204, controller 134 may signal short-pulse laser 130 to initiate correction of the pore based on stored settings for correction of pores 204. For example, short-pulse laser beam 136 may be applied to material surrounding pores 204 to melt the material and fill in the pores 204. The settings to control short-pulse laser beam 136 to correct pores 204 may be based on experimental testing to create the most efficient methods for correcting pores 204 of any shape and size.

In some embodiments, the detection, ablation, and checking may be in a continuous feedback loop detecting by sensor 132 and controlling short-pulse laser 130 by controller 134. A minimum threshold of correction of the defect may be met to stop short-pulse laser 130. For example, the topology of part 110 may be detected by sensor 132 and found to be out of specification when compared to specifications by controller 134. Short-pulse laser 130 may be operated to shoot short-pulse laser beam 136 to ablate spatter particle 302 that is out of specification. Sensor 132 may continuously track the progress of ablation sending the sensor data to controller 134. Processor 138 may store any linear, nonlinear, or adaptive controller for controlling short-pulse laser 130 to ablate the topographic defect. Furthermore, a plurality of controllers may be stored and implemented based on the classification of the defect.

Figure 4A:
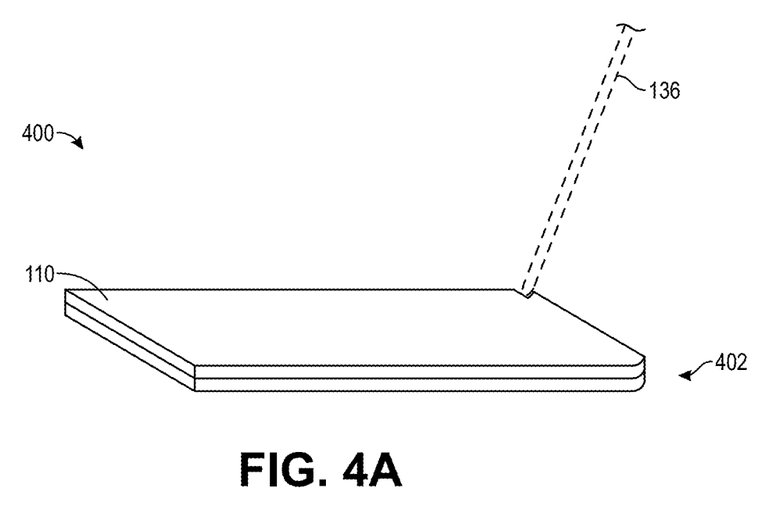
FIG. 4A depicts an exemplary process of ablating curl up.

FIG. 4A depicts a manufactured part with a geometry defect resulting from the LPBF process generally referenced by the numeral 400. A geometry may be caused by built up stresses in part 110. Part 110 may comprise any number of layers 402. In some embodiments, each layer 402 may be about 20 μm to about 60 μm thick for a part 110 that is about 3 inches. Built up stresses may cause any number of geometry defects such as, for example, curl up, surface roughness, cracking, and layer separation in layers 402. Curl up may also stack up causing high topology and possible tearing coater blade 116 when the next layer of metal powder 108 is added. When curl up occurs, as shown in FIG. 4A, short-pulse laser 130 may be controlled to ablate the high topography without melting the part 110. Sensor 132 may detect high topography of part 110 due to curl up and short-pulse laser 130 may be controlled to ablate the high topography such that the surface of part 110 is within a specified threshold. The high topography on the section of part 110 may be reduced such that part 110 remains within specification.

Figure 4B:
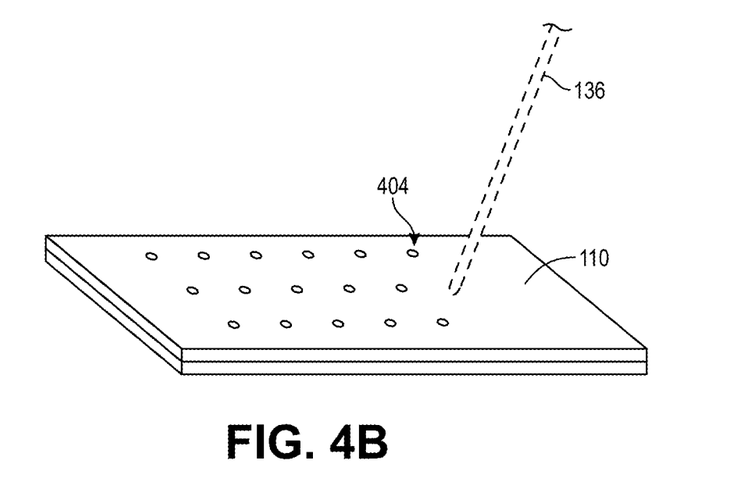
FIG. 4B depicts an exemplary process of stress reduction.

FIG. 4B depicts an exemplary, stressed part with added stress relief openings 404. In some embodiments, relief openings 404 may be added to each layer 402 using short-pulse laser beam 136 during the LPBF process. Relief openings 404 may reduce stress in each layer 402 of part 110 such that the stress does not build up between layers 402.

Removing the stress between layers 402 may reduce the likelihood of curl up and other stress-related defects. It may be known from experimental testing or from a history of part evaluation that stress builds up between layers 402. As such, the process of adding relief openings 404 may be performed automatically based on the material properties of part 110 and based on sensor 132 data tracking the manufacturing characteristics of part 110. The manufacturing characteristics may be temperature of melt zone, temperature of metal vapor 206, and the like. As such, stress between layers 402 may be expected based on the manufacturing characteristic and material properties of part 110. Relief openings 404, opening patterns, and size of openings may be added to part 110 and may be adjusted accordingly to optimally reduce stress in part 110. In some embodiments, relief openings 404 may comprise holes or annular grooves having any desired geometry. In some embodiments, relief openings 404 may be formed by drilling at least one hole or annular groove in the layer 402, such as with a jig, and/or a strain gauge rosette. In some embodiments, relief openings 404 may be formed by ablation, such as with the short-pulse laser 130. In some embodiments, each relief opening 404 may have a different configuration. In some embodiments, relief opening 404 may have a diameter of about 0.001 inch. In some embodiments, relief opening 404 may be about 0.01 inch to about 0.005 inch.

Figure 5:
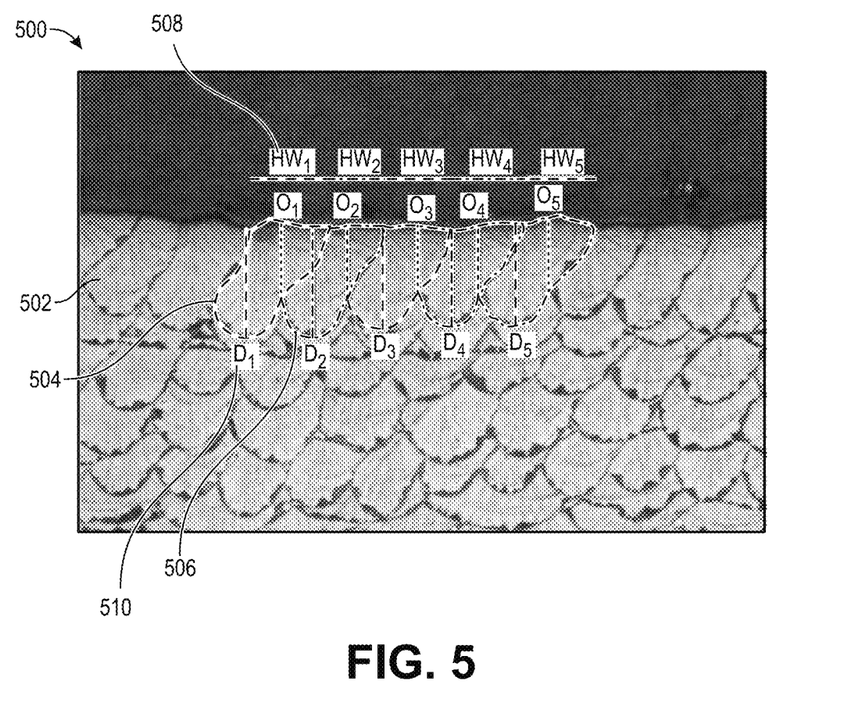
FIG. 5 depicts exemplary defects from uneven gas flow.

In some embodiments, uneven flow has caused inconsistent material properties in melt pools 502. FIG. 5 depicts an exemplary top surface 500 of part 110 as seen cut perpendicularly to the top vectors with melt pools 502 forming part 110. In some embodiments, inert cover gas may be applied to the target location of AM laser beam 128. The inert cover gas may be applied to control the environment during the LPBF process. In some embodiments, the inert gas may be any non-reactive gas such as, for example, argon or nitrogen. The inert gas may be caused to flow across the active portion of part 110 where AM laser beam 128 is interacting with metal powder 108. The inert gas may replace reactive gases that exist in the air such as, for example, oxygen and carbon dioxide, thus, reducing the likelihood that impurities are incorporated into part 110. Furthermore, passing the inert gas over the interaction location reduces the likelihood of vapor plume 212 forming, thus, reducing the likelihood that pores 204 are formed.

As described above, the vapor plume 212 may attenuate AM laser beam 128 resulting in inconsistent interactions between AM laser beam 128 and metal powder 108. The flow of inert gas over the metal vapor 206 may prevent vapor plume 212 from forming thus reducing the likelihood of pores 204. However, in some cases, the inert gas may cause inconsistencies in material properties. The inert gas flow over the interaction location may be uneven causing metal vapor 206 to cool at different rates resulting in inconsistent material properties as shown in FIG. 5. Gas flow across part 110 may be inconsistent, which causes part variation due to different cooling rates and spatter reduction effectiveness. FIG. 5 depicts an exemplary top surface of a part 110 as seen cut perpendicularly to the top vectors with melt pools 502 forming part 110. Each melt pool comprises a hatch width (HW), depth (D), and overlap (O) with adjoining melt pools. The inconsistencies in the melt pools can be seen in the varying dimensions of each melt pool. Defects caused by inconsistent cover gas in the LPBF process are shown in first melt pool 504 and second melt pool 506. As depicted, hatch width 508 and depth 510 of the melt pools are inconsistent. The varying sizes of the melt pools results in inconsistent strength across part 110. As such, part 110 may be weaker in some locations and stronger in other locations.

Figure 6:
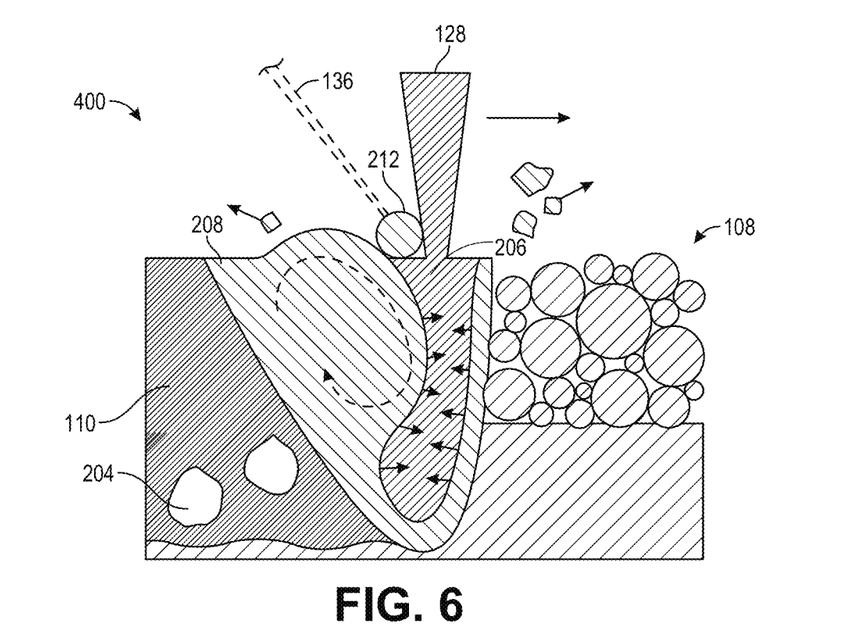
FIG. 6 depicts an exemplary vapor plume ablation.

In some embodiments, short-pulse laser beam 136 may be applied to vapor plume 212 or metal vapor 206 as illustrated in FIG. 6. When short-pulse laser beam 136 is applied to vapor plume 212, vapor plume 212 may be ablated. As such, the likelihood of incorporating impurities from the air and creation of pores 204 may be reduced. Therefore, the inert gas flow may not be necessary when short-pulse laser beam 136 is used to ablate vapor plume 212. Furthermore, as a preventative step, short-pulse laser beam 136 may be applied directly to metal vapor 206 to prevent vapor plume 212 from even forming. The application of short-pulse laser beam 136 to metal vapor 206 may be continuous or periodic depending on laser characteristics, material properties, and the like. Experimental testing may be conducted to determine an optimal method of application of short-pulse laser beam 136 to metal vapor 206. The control process of detecting and controlling the short-pulse laser 130 based on the sensor data may be applied that optimizes ablation of vapor plume 212. Because no inert gas flow is necessary, there is no risk of providing uneven inert gas distribution and, therefore, there is no, or little, risk of creating the defects depicted in FIG. 5. When inert gas flow across the part 110 is inconsistent, this causes part variation due to different cooling rates and spatter reduction effectiveness.

Figure 7:
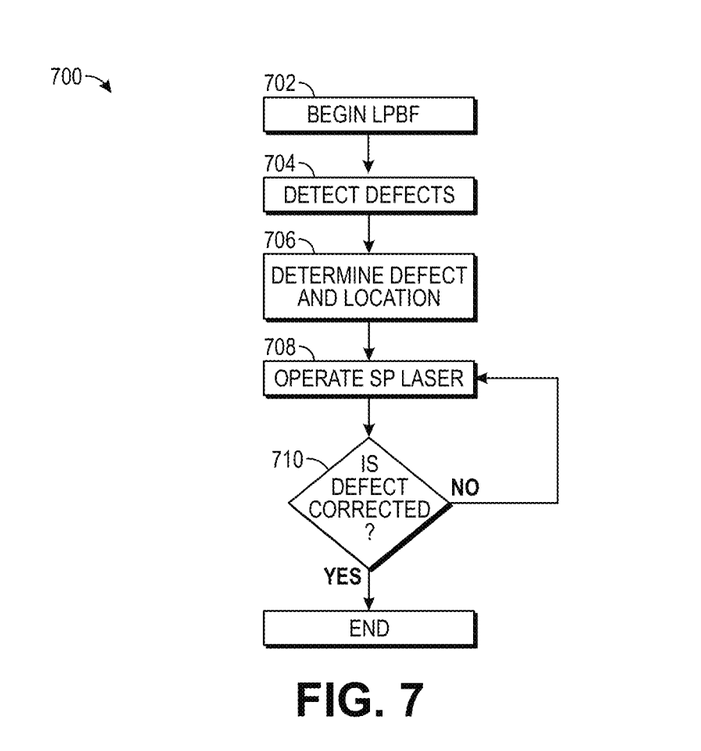
FIG. 7 depicts an exemplary process for removing defects in the LPBF manufacturing process.

FIG. 7 depicts an exemplary process of removing defects by short-pulse laser 130 in LBPF manufacturing generally referenced by numeral 700. At step 702, the LPBF process begins. AM laser 122 may be operated to fire AM laser beam 128 into metal powder 108 causing metal powder 108 to heat up. The heat may cause metal powder 108 to melt causing metal vapor 206 to form. Metal vapor 206 may then cool to form melt pool 208 and further cool to form a solid, thereby creating part 110.

In some cases, various defects such as, for example, raised topography, pores 204, curl up, and inconsistent cooling may be created during the LPBF process. The defects may be caused by spatter 202 from melt pool 208 landing on a cooled portion of part 110. When spatter 202 cools it may become a plurality of spatter particles 302. Each spatter particle 302 may be a raised defect on the surface of part 110. As such, spatter particle 302 may cause a variety of defects, such as compromising material properties of part 110 and damaging coater blade 116. Similarly, in some cases, vapor plume 212 may be ejected from metal vapor 206 creating pores 204 in part 110 as described above. Furthermore, in some cases, stress may build up in each layer 402 of part 110 creating curl up as described above. The stress may increase between each layer 402 provided causing the edges of part 110 to curl up and, in some cases, split between layers or crack. In some cases, inert gas may be applied to metal vapor 206 and melt pool 208 to reduce vapor plume 212. Vapor plume 212 may create pores 204 and cause attenuation of AM laser beam 128. Furthermore, inadequate, or uneven inert gas flow across metal vapor 206 and melt pool 208 may cause inconsistencies in material properties of part 110 as described above.

At step 704, defects may be detected by sensor 132. In some embodiments, sensor 132 may be a camera. The camera may be an optical camera to detect any wavelength of electromagnetic radiation including visible, infrared, and thermal ranges. Furthermore, sensor 132 may be a camera-laser combination that bounces a laser and/or a light off part 110 and detects the reflected laser and/or light as a laser range finder. In some embodiments, the light may enhance the topographical defects such that the defects may be more visible to optical sensors. In some embodiments, sensor 132 may be a plurality of the same or different sensors in combination as described above.

In some embodiments, sensor 132 may be configured to detect vapor plume 212. Sensor 132 may be any of the above-described optical sensors and may capture images of metal vapor 206, melt pool 208, part 110, and short-pulse laser beam 136. As such, sensor 132 may capture the LPBF process such that the sensor data may be compared to known sensor data representing successful and unsuccessful processes. The sensor data may pass through a machine learning algorithm that has been trained on known data to determine a probability of defects being formed and create a model therefrom. Sensor 132 may be any sensor or combination of sensors that may capture the parts and processes of the LPBF process that may be analyzed.

In some embodiments, the sensor data may be indicative of process inconsistencies such as, AM laser attenuation, not enough heat at the interaction point, vapor plume 212 creation, and the like. The sensor data may be indicative of vapor plume 212 creation. When vapor plume 212 is detected, controller 134 may detect the location thereof and classify vapor plume 212 and send instructions to short-pulse laser 130 to operate short-pulse laser beam 136 to ablate vapor plume 212. As such, the likelihood of pores 204 developing in part 110 may be reduced.

At step 706, controller 134 may obtain the sensor data and determine the location and classification of defects. In some embodiments, the sensor data may be obtained by controller 134 and controller 134 may process the sensor data to determine a defect and a location of the defect. Controller 134 may obtain the sensor data and compare the sensor data to data indicative of known defects to determine if part 110 has a defect. For example, controller 134 may comprise computer algorithms for object recognition and tracking such as, for example, neural networks and statistical algorithms, to process images and determine a probability of pores 204 and spatter particles 302 on the surface of part 110. The sensor data may be any data from the sensor types described above such as, for example, optical images, thermal data, and range data. As such, controller 134 may utilize the stored non-transitory computer-readable media, executed by processor 138 to determine if a defect is present on the surface of part 110 and the three-dimensional location of any defects.

At step 708, controller 134 may then send the location of the defect as well as any instructions to short-pulse laser 130 to correct the defect. In some embodiments, the instructions may comprise power settings, duration of interaction, a pulse width modulation (PWM) signal to control actuators to a position for aiming short-pulse laser 130, and the like. The instructions sent by controller 134 may be based on historical experimental data for correcting the determined classification of the defect. In some embodiments, controller 134 may store historical data indicative of previous defects and laser parameters that corrected the previous defects as described above. As such, when a defect is detected, the instructions to correct the defect are based on effective results of previous defect corrections. Employing this technique will ensure that appropriate steps are conducted to correct the defects.

If the sensor data indicates that part 110 is out of specification or that material properties are out of designated threshold values, controller 134 may stop the LPBF process. Furthermore, a notification may be sent to a user and the sensor data along with any instructions generated by controller 134 may be stored for review. In some embodiments, the information from the sensor data and review may be stored for future training data for machine learning applications.

At step 708, short-pulse laser 130 may be operated to correct high topography by controller 134 based on the sensor data. High topography may be ablated by short-pulse laser 130 when high topography is detected. The high topography may be detected, and Short-pulse laser may be controlled to ablate the high topography to within a threshold height based on the surface height of part 110. In some embodiments, the high topographical defect may be classified as, for example, curl up or spatter.

In some embodiments, when the sensor data is indicative of a growing vapor plume 212 or is indicative that a vapor plume 212 is emerging, short-pulse laser 130 may be operated to ablate vapor plume 212. Ablating vapor plume 212 prior to releasing from metal vapor 206 may reduce the likelihood that pores 204 develop in part 110 as described above.

In some embodiment, short-pulse laser 130 may be preemptively applied to melt stress relief openings 404 in each layer 402 of part 110 as described above. As each layer 402 of part 110 is melted to each subsequent part, stress may build up between parts resulting in stress cracks, and even failure of part 110. To relieve stress, relief openings 404 may be added to each layer 402. Relief openings 404 may be added based on a comparison of the material characteristics and the measured properties during the LPBF process to historical data. When the processes and properties measured by sensor 132 match data that historically results in stress, relief openings 404 may be added to reduce the likelihood that stress defects occur.

At step 710, a check may be performed to determine if the defect has been corrected. Sensor 132 may be operated to detect the surface of part 110 and the LPBF process as described above. Furthermore, sensor 132 may be specifically operated by controller 134 to measure the location of part 110 that was modified by short-pulse laser beam 136. The sensor data may then be analyzed by processor 138 to determine if the modifications have corrected the defect. The sensor data may be compared to threshold data and part specification data to determine if part 110 is now within specification. If part 110 is not within specification the process may return to step 708 where short-pulse laser 130 is operated to further correct the remaining defect. If part 110 is within specification, the process may end.

In some embodiments, step 708 and step 710 are in a continuous loop. For example, when a defect is detected, controller 134 may enter a closed loop where sensor 132 detects the defects, controller implements classification and control of Short-pulse laser 130 to correct the defect. The control loop may continue until a detectable threshold of part 110 is met, and the control loop is ended.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for preventing formation of defects on a part during a laser powder bed fusion manufacturing process, the system comprising:
   at least one sensor configured to detect parameters associated with the laser powder bed fusion manufacturing process;

an ablation laser operable to remove the defects;
a fusion material configured to form the part;
a manufacturing laser operable to melt the fusion material to form the part;
at least one processor; and
one or more non-transitory computer-readable media storing computer-executable instructions that, when executed by the at least one processor, perform a method of removing the defects from forming on the part during the laser powder bed fusion manufacturing process, the method comprising:
controlling the manufacturing laser to melt the fusion material and form the part at a part formation region;
detecting, by the at least one sensor, vapor plume characteristics of a vapor plume at the part formation region; and
during the laser powder bed fusion manufacturing process, further providing the ablation laser to the defects to remove the defects based on the vapor plume characteristics.

2. The system of claim 1, wherein the at least one sensor comprises an optical camera, a laser range finder, a light detecting and ranging sensor, or a high-speed camera.

3. The system of claim 1, wherein the part comprises a metal powder, and the ablation laser comprises a femtosecond laser.

4. The system of claim 1, wherein the defects comprise a pore and the pore is corrected by remelting an area around the pore.

5. The system of claim 1, wherein the defects comprise curl up and the ablation laser is activated to ablate high topography associated with the curl up to within a specified tolerance based on predetermined specifications of the part being manufactured.

6. The system of claim 1,
wherein the vapor plume characteristics are detected by an infrared sensor.

7. The system of claim 1, wherein the method further comprises:
detecting an interaction between an additive manufacturing laser and a metal powder used in the laser powder bed fusion manufacturing process; and
determine a likelihood that a manufacturing defect will occur.

8. The system of claim 7, wherein the method further comprises operating the ablation laser to reduce the likelihood that the manufacturing defect will occur.

9. The system of claim 1, wherein the method further comprises:
detecting a defect of the defects on the part;
determining, by the at least one processor, a classification of the defect based on a database of classified defects; and
controlling, by the at least one processor, a plurality of parameters of the ablation laser to remove the defect based on the classification of the defect.

10. A method of preventing defects on a part during a laser powder bed fusion manufacturing process, the method comprising:
providing a manufacturing laser to a metal powder to create the part by the laser powder bed fusion manufacturing process;
detecting, by at least one sensor, vapor plume characteristics of a vapor plume;
determining a defect location based at least in part on the vapor plume characteristics; and
controlling, by a processor, a short-pulse laser to be directed to the defect location to remove a defect.

11. The method of claim 10, further comprising:
detecting, by the at least one sensor, the defect on the part;
determining, by the processor, a classification of the defect based on a database of classified defects; and
controlling, by the processor, a plurality of parameters of the short-pulse laser to remove the defect based on the classification of the defect.

12. The method of claim 11, further comprising:
determining the classification of the defect by a machine learning algorithm trained with data indicative of common defects.

13. The method of claim 10, further comprising:
detecting a difference in topography or in temperature using the at least one sensor; and
detecting spatter based on the difference in the topography or in the temperature.

14. The method of claim 13, further comprising:
detecting the topography using a light detecting and ranging sensor; or
detecting the temperature using a camera operable to detect infrared wavelengths.

15. The method of claim 10, further comprising adding, by the short-pulse laser, stress-relief openings to at least one layer of the part during manufacturing.

16. One or more non-transitory computer-readable media storing computer-executable instructions that, when executed by at least one processor, perform a method of preventing defects on a part during a laser powder bed fusion manufacturing process, the method comprising:
providing a manufacturing laser to a metal powder to create the part by the laser powder bed fusion manufacturing process;
detecting vapor plume characteristics of a vapor plume at a part formation region;
determining, by at least one sensor, a defect location based at least in part on the vapor plume characteristics; and
controlling a short-pulse laser to be directed at the defect location to remove a defect.

17. The media of claim 16, wherein the at least one sensor comprising an optical camera, a laser range finder, a light detecting and ranging sensor, or a high-speed camera.

18. The media of claim 16, wherein the short-pulse laser is a femtosecond laser or a nanosecond laser.

19. The media of claim 16,
wherein the defect is a first defect;
wherein the method further comprises detecting a second defect, wherein the second defect is caused by at least one of spatter particles, the vapor plume, or curl up.

20. The media of claim 16, wherein the method further comprises adding stress-relief openings to at least one layer of the part during manufacturing of the part using the short-pulse laser.

* * * * *